Jan. 10, 1956　　　J. S. GREGORIUS　　　2,730,338
GLASS REFINING APPARATUS
Filed Sept. 14, 1951　　　　　　　　　　2 Sheets-Sheet 1
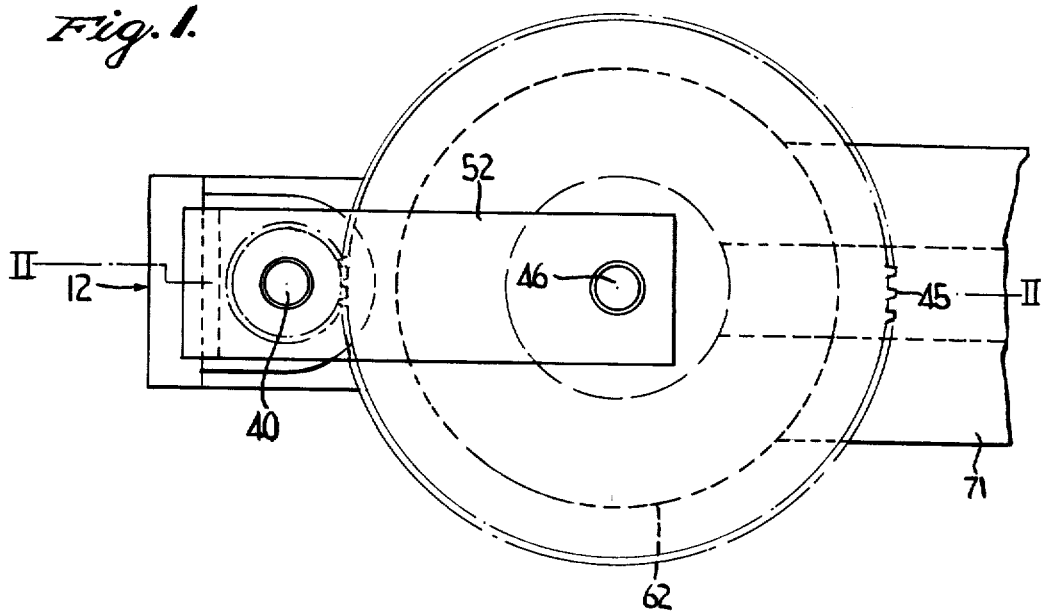
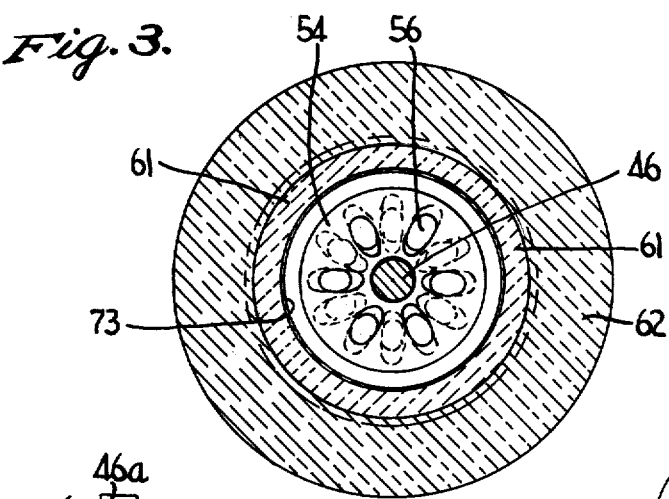
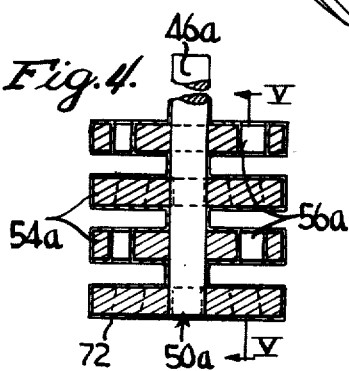
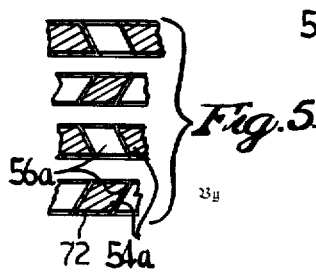
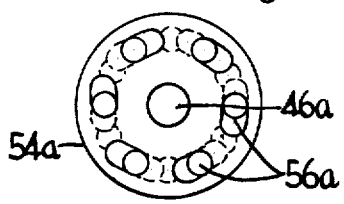
Inventor
JOSEPH S. GREGORIUS
Oscar L. Spencer
Attorney

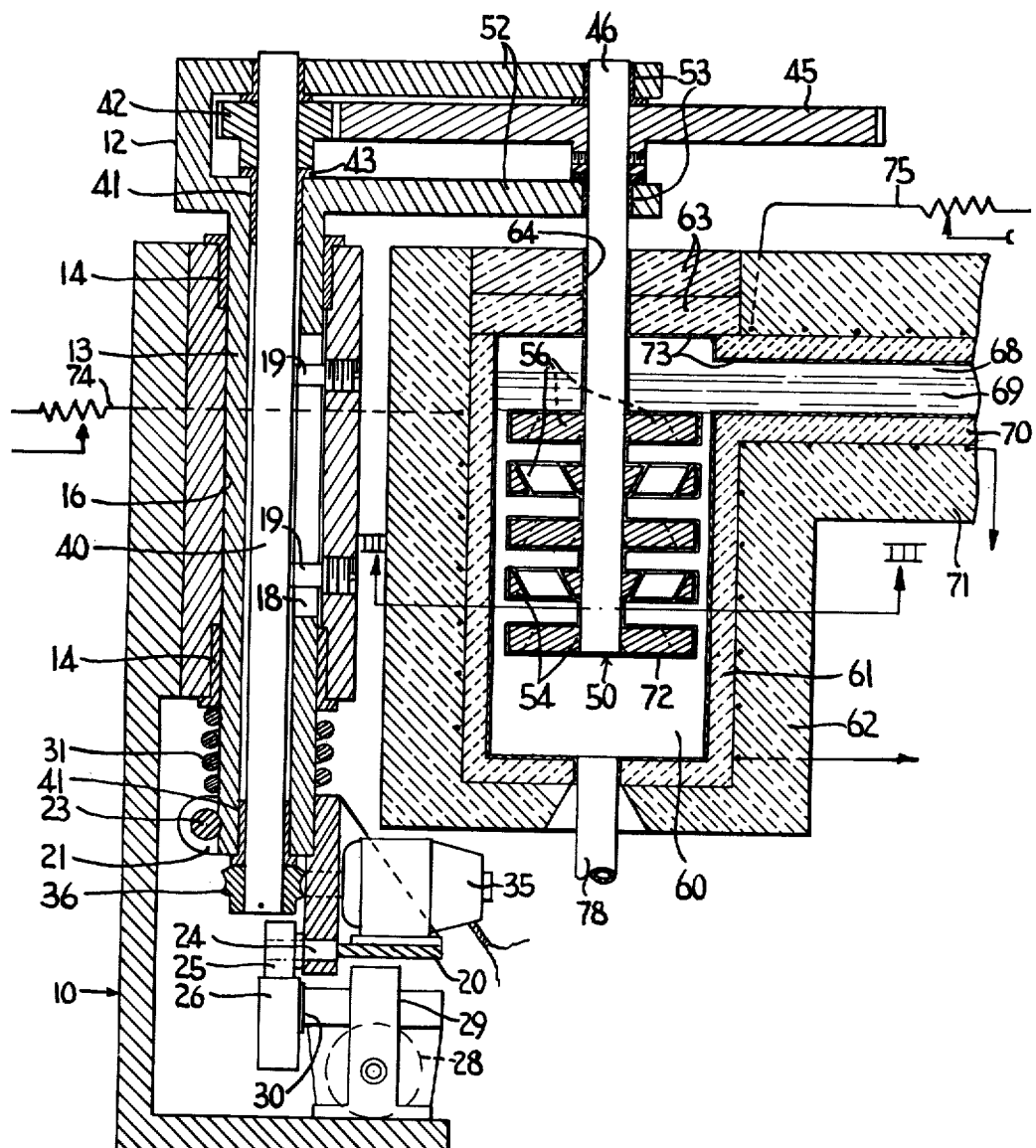

United States Patent Office 2,730,338
Patented Jan. 10, 1956

2,730,338

GLASS REFINING APPARATUS

Joseph S. Gregorius, Tarentum, Pa., assignor to Pittsburgh Plate Glass Company, Allegheny, Pa., a corporation of Pennsylvania Application September 14, 1951, Serial No. 246,596

6 Claims. (Cl. 259—8)

This invention relates to the refining of molten glass to produce optimum homogenization thereof, and it has particular relation to a stirring mechanism designed to effect such homogenization.

One object of the invention is to provide a mechanism effective to homogenize a confined column of molten glass flowing downwardly from a supply pool to a discharging outlet.

Another object of the invention is to provide mechanism for controlling homogenizing operations in a mass of molten glass with regard to compound movements of a stirring assembly.

In one application of the invention, a tank of molten glass melted to proper consistency is supplied to the top of a column of glass confined in an upright container which preferably is tubular or cylindrical in form. As the glass flows downwardly through the container, it passes a series of rotatably driven plates which shear the glass at each plate to prevent striae, or so-called ream, from forming and to dissipate any striae which previously may have been present in the mass of glass. A number of spaced stirring plates in the form of perforated disks are mounted on a rotatably driven shaft to constitute the homogenizing assembly. The planes of the disks are disposed at right angles to the axis of the shaft and openings are bored in the disks at angles to the planes thereof. In adjacent disks, openings are bored in opposite angular directions. Additional stirring action can be attained by reciprocating the shaft on its vertical axis while it is being rotated.

In the drawings:

Fig. 1 is a fragmentary plan of a homogenizing apparatus; Fig. 2 is a fragmentary vertical section taken substantially along the line II—II of Fig. 1; Fig. 3 is a horizontal section taken substantially along the line III—III of Fig. 2; Fig. 4 is a vertical section illustrating an alternate form of stirring disks; Fig. 5 is a fragmentary vertical section taken substantially along the line V—V of Fig. 4; and Fig. 6 is a plan of the stirrer assembly shown in Fig. 4.

In one form of installation for practicing the invention, a stationary support 10 carries a vertically reciprocable frame 12 which has a tubular upright section 13 mounted in upper and lower bearing sleeves 14 so as to guide the tubular section in vertical movements. These sleeves are set in upper and lower ends of a cylindrical opening 16 formed in the stationary support. A vertical slot 18 formed in the wall of the tubular section receives the inner ends of screw bolts 19 which are mounted horizontally one above the other in the wall of the stationary support. The tubular section is thus slidable vertically in the stationary support, but it is held against rotation by means of the bolts 19.

A motor support 20 is rigidly secured to the lower tubular section 13 of the frame by means of a split collar 21 in which a bolt 23 is mounted to tighten the collar upon the lower end of this section. A horizontal stud shaft 24 mounted in the lower portion of the motor support 20 carries a roller 25 the peripheral surface of which is engaged by a cam 26. Suitable driving mechanism, including an electric motor 28 and conventional reduction gearing 29 illustrated diagrammatically, is mounted upon the lower portion of the stationary support 10. The cam is connected, as indicated at 30, to the gearing 29 and is thus rotatable to operate the frame in vertical reciprocal movements as the frame slides in the bearings 14. The upward movement of the frame is resisted by the action of a coil spring 31 mounted under compression between the lower bearing sleeve 14 and the upper side of the split collar 21. The spring surrounds the lower portion of the tubular section 13. The face of the roller 25 is thus held firmly and yieldably in contact with the face of the cam 26.

The motor support 20 rigidly carries an electric motor 35 which has a worm gear drive 36 connected thereto and to an upright shaft 40 for rotating the latter. Upper and lower bearing sleeves 41 mounted in the opposite end portions of the vertically movable tubular section 13 rotatably support the vertical shaft 40. A gear 42 rigidly secured upon the upper end portion of the shaft 40 rests rotatably in thrust bearing relation upon an upper flange 43 of the upper bearing sleeve and engages a larger gear 45 which is rigidly secured to an upright shaft 46 of a stirrer or homogenizer assembly 50.

Horizontal arms 52 spaced one above the other comprise the upper portion of the frame 12 and carry bearing sleeves 53 which are vertically aligned therein so as to support the stirrer shaft 46 in a vertical position. Vertically spaced perforated disks 54 are secured rigidly upon the shaft 46. Each of these disks is formed with openings 56 which are bored therein so that the axis of the bore is disposed at an angle to the axis of the shaft 46. The axes of boring of the openings in adjacent disks are angularly disposed in opposite directions. That is, the axes of boring in the upper disk extend upwardly and angularly toward the axis of the shaft 46. In the next adjacent disk, the axes of boring extend upwardly and angularly away from the axis of the shaft 46, but if extended downwardly they will intersect the axis of the shaft. It is also to be noted that the openings in one disk can be staggered with respect to openings in the next adjacent disk.

The number of these disks as well as the number of openings in each disk can be varied over a relatively wide range. However, for convenience in illustration, six of the openings are formed in each disk. All of the openings are substantially the same in depth and diameter.

The stirrer 50 operates in an upright cylindrical chamber 60 which is formed of refractory material including an inner section 61 and an outer block section 62. The upper portion of the chamber is covered by means of refractory blocks 63 and is substantially closed, although formed with an opening 64 through which the shaft 46 extends. A horizontal channel 68 communicates directly with the upper portion of the upright chamber 60 for conveying molten glass 69 thereto from a melting chamber (not shown). A tubular refractory inner section 70 defines the channel 68 and is reinforced by means of a continuation 71 of the outer refractory block structure 62 which defines the upright chamber 60. The stirrer or homogenizer structure 50 is subjected to high temperatures of 2250° F. to 2400° F. in the molten glass and therefore must be constructed of such material as to be resistant to the high temperatures as well as to the action of the molten glass under these conditions. A burned clay or porcelain type of refractory can be employed to advantage for the body of the shaft 46 and disks 54. These elements are protected by a sheathing 72 of platinum which can be very thin and yet will provide adequate protection for the refractory without disturbing the purity of the molten glass because such glass does not appreciably deteriorate the platinum, either by absorption or otherwise. An additional sheathing or lining 73 of heat resistant metal, such as sheet platinum, extends throughout the inner walls of the chamber 60 and into the opening 64.

Conventional electrical heating circuits 74 and 75 are applied to the cylindrical chamber 60 and channel 68, respectively, for controlling the temperature of the molten glass therein. A suitable outlet 78 in the bottom of the chamber 60 provides for the discharge of molten glass after it has been completely refined by the homogenizing action.

In the form of stirrer 50a shown in Figs. 4, 5 and 6, disks 54a and openings 56a formed therein correspond generally to the disks 54 and openings 56, respectively, as previously described. The boring of the openings with respect to the structure shown in Figs. 4, 5 and 6 is such that the axis of boring in each opening is spaced outwardly from the shaft 46a and is in a plane that is disposed approximately at right angles to a disk diameter passing through the opening. The direction of inclination of the axes of boring in adjacent disks is reversed or opposite. The stirrer construction is protected by a sheathing 72a of platinum corresponding to the sheathing 72 described above.

In operating the stirrer 50, molten glass is conveyed from a source, such as a melting tank (not shown) through the channel 63 directly into the upper portion of the chamber 60. It is desirable that any atmosphere in the chamber and channel be free from exposure to air from the outside. If desired, the supply of glass can completely fill the channel and chamber under a head of molten glass of appropriate level. As the motors 23 and 35 operate, the shaft 46 is driven rotatably while the frame 12 is vertically reciprocated by actuation of the cam 26 against the roller 25. With respect to the stirrer structure shown in Fig. 2, the molten glass passing through the upper disk is forced downwardly away from the axis of the shaft while the edges of the disk, including those defining the openings, shear the column of glass passing downwardly through the cylindrical chamber. In this manner, the glass is thoroughly homogenized and formation of undesirable ream and striae is prevented.

The stirrer 50 or 50a can be driven rotatably without reciprocating the shaft 46 or 46a. Since the motors 28 and 35 are independently operable, it is, of course, only necessary to dispense with the operation of the motor 23 and the stirrer will then function in the manner specified.

Although alternate forms of structure illustrating the invention have been shown and described in detail, it will be apparent to those skilled in the art that the invention is not so limited but that various changes can be made therein without departing from the spirit or scope of the invention as exemplified in the appended claims.

I claim:

1. In a glass homogenizing apparatus, a refractory structure defining an upright container having an inlet at its upper portion for conveying a stream of molten glass thereto, means for maintaining the glass in molten form, an upright driven shaft rotatable in the container, spaced disks mounted in substantially horizontal planes upon the shaft and in the container, each disk having a series of openings bored therethrough, the axis of boring of each opening being disposed obliquely to the mean plane of the disk in which it is formed, the oblique angularity of the axes of boring of the openings in one disk being disposed substantially oppositely to the oblique angularity of the axes of boring of the openings in the next adjacent disk.

2. In a glass homogenizing apparatus adapted to receive molten glass from a molten glass supply, a refractory structure defining an upright container having an inlet channel at its upper portion for conveying the molten glass thereto, an upright driven shaft rotatable in the container, stirring elements spaced along the length of the shaft and extending rigidly and laterally toward the wall of the container, said shaft and stirring elements being composed of refractory material and having a sheathing of metallic material covering the surfaces thereof in said container, the stirring elements being provided with oblique apertures therethrough, the inclination of the apertures through one stirring element being disposed substantially oppositely to the inclination of the apertures through the next adjacent stirring element.

3. In a glass homogenizing apparatus adapted to receive molten glass from a molten glass supply, a refractory structure defining an upright container having an inlet channel at its upper portion for conveying the molten glass thereto and having a glass discharging outlet at its lower portion, an upright driven refractory shaft rotatable in the container, stirring elements spaced along the length of the shaft and extending rigidly and laterally therefrom toward the wall of the container, said shaft and stirring elements being composed of refractory material and having sheathing of platinum covering the surfaces thereof in said container, the stirring elements being provided with oblique apertures therethrough, the inclination of the apertures through one stirring element being disposed substantially oppositely to the inclination of the apertures through the next adjacent stirring element.

4. In a glass homogenizing apparatus, in combination, a vertically disposed container having an upper inlet and a bottom outlet through which molten glass is passed at a rate to keep the container filled, a vertically disposed rotating shaft within the container and having its bottom end spaced above the container outlet, and a plurality of vertically spaced discs mounted on the shaft intermediate the container inlet and outlet, each disc being of a diameter less than the inside diameter of the container and having a plurality of inclined apertures through the thickness of the disc the inclination of the apertures through each disc being substantially parallel and disposed substantially oppositely to the inclination of the apertures through the next adjacent disc.

5. Apparatus as in claim 4 in which the vertically disposed shaft and assembled discs are both rotatable and vertically reciprocable.

6. In a glass homogenizing apparatus, in combination, a vertically disposed container having an upper inlet and a bottom outlet through which molten glass is passed at a rate to keep the container filled, a vertically disposed reciprocal shaft within the container and having its bottom end spaced above the container outlet and a plurality of vertically spaced discs mounted on the shaft and spaced from the walls of the container, and vertically reciprocal with said shaft within the volume of molten glass, each of said discs being provided with a plurality of inclined apertures through the thickness of the disc the inclination of the apertures through each disc being disposed substantially oppositely to the inclination of the apertures through the next adjacent disc.

References Cited in the file of this patent

UNITED STATES PATENTS

| 44,179 | Gibson | Sept. 13, 1864 |
| 383,489 | Peters | May 29, 1888 |
| 1,116,230 | Boyd | Nov. 3, 1914 |
| 1,603,221 | Thomson | Oct. 12, 1926 |
| 1,852,218 | Peiler | Apr. 5, 1932 |
| 2,470,558 | Honise | May 17, 1949 |
| 2,515,478 | Tooley et al. | July 18, 1950 |
| 2,570,079 | Spermulli | Oct. 2, 1951 |

Dedication 2,730,338.—*Joseph S. Gregorius*, Tarentum, Pa. GLASS REFINING APPARATUS. Patent dated Jan. 10, 1956. Dedication filed July 25, 1973, by the assignee, *PPG Industries, Inc.*

Hereby dedicates the remainder of its term to the free use and benefit of the People of the United States.

[*Official Gazette December 4, 1973.*]